A. W. Olds,
Portable Fence,
Nº 55,352.
Patented June 5, 1866.
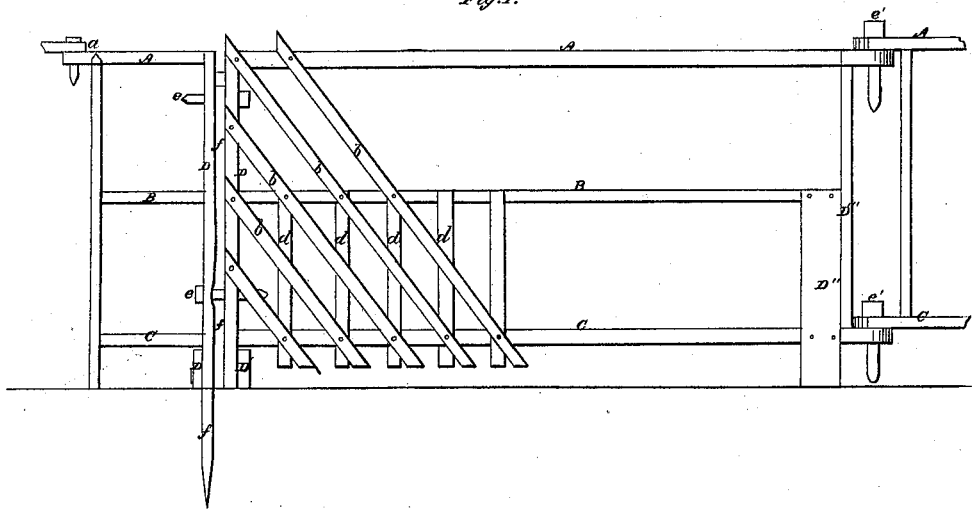
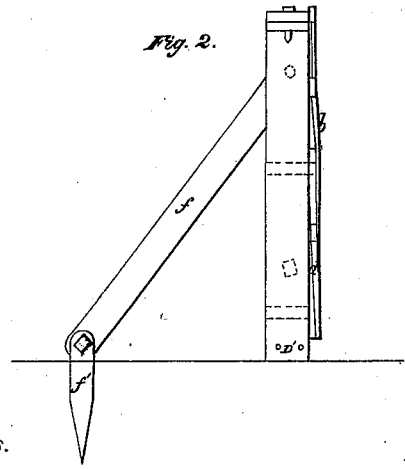
Witnesses.
Frank Alden
A. W. McClelland
Inventor.
A W Olds.

UNITED STATES PATENT OFFICE.

A. W. OLDS, OF GREEN OAK, MICHIGAN.

IMPROVEMENT IN FENCES.

Specification forming part of Letters Patent No. 55,352, dated June 5, 1866.

*To all whom it may concern:*

Be it known that I, A. W. OLDS, of Green Oak, in the county of Livingston and State of Michigan, have invented certain new and useful Improvements in Constructing Fences; and I do hereby declare that the following is a full and complete description of the same, reference being had to the accompanying drawings, making a part of this specification, in which—

Figure 1 is a front elevation of a section of the fence. Fig. 2 is an end view.

Like letters of reference refer to like parts.

In Fig. 1, A B C are three horizontal strips of boards or plank placed equally distant apart, and secured at the ends to perpendicular pieces or strips D D, that rest upon the ground. The lower ends of these pieces may be enlarged by securing a piece, D', on one side, as represented.

Lath or thin narrow strips b d are attached to one side of the pieces A B C, as shown in Fig. 1. The strips d are short and placed perpendicular on the lower section of the fence, over which the long slats b are placed diagonally across the panel, at such an angle as to cross three of the short strips, and they are all attached to the horizontal strips and perpendicular pieces at the ends by nails. The same nails that attach the long strips, pass through the short ones and secure them likewise in place.

The panels are connected together by means of two pins, e, put horizontally through the end pieces, D, near the upper and lower part of the fence. This is the best method where the ground is nearly level. Between the ends D D, and hung on the upper pin, e, is a brace, f, to the lower end of which is pivoted a stake, f', that is to be driven into the ground.

Another mode of uniting the panels is by placing the ends of the upper and lower horizontal strips on each other and putting pins e' perpendicularly through them. This is well adapted for turning corners and for making fence-gates. The panels can be attached by putting a pin through the ends of the upper horizontal strips, as seen at a in Fig. 1. This is a good way of uniting the panels where the ground is uneven.

When both the upper and lower horizontal pieces project at the end, for hanging a gate or any other purpose, the panel is supported by a short piece, D'', attached to the middle and lower strips, as shown in Fig. 1, and then between the strips is a perpendicular piece, D''', to which they are attached.

In the construction of this fence the three horizontal pieces render it very strong and secure a firm attachment for the lath. By placing the lath diagonally, and at the lower section vertically, as described, the spaces between the lath are smaller than they could be made in any other way with the same amount of timber. By having part of the lath short the timber is saved and the upper part of the fence offers less resistance to the wind.

What I claim as my improvement, and desire to secure by Letters Patent, is—

The arrangement of the strips A B C and slats b d, in combination with the brace f, and mode of connecting the panels together, substantially as and for the purpose set forth.

A. W. OLDS.

Witnesses:
F. L. CLEMENTS,
C. S. CLEMENTS.